United States Patent [19]

Bauer

[11] Patent Number: 5,214,615

[45] Date of Patent: May 25, 1993

[54] THREE-DIMENSIONAL DISPLACEMENT OF A BODY WITH COMPUTER INTERFACE

[76] Inventor: Will Bauer, 11514-77 Ave., Edmonton, Alberta, Canada, T6G 0M1

[21] Appl. No.: 764,624

[22] Filed: Sep. 24, 1991

Related U.S. Application Data

[63] Continuation-in-part of Ser. No. 484,985, Feb. 26, 1990, Pat. No. 5,107,746.

[51] Int. Cl.⁵ .............................................. G01S 3/80
[52] U.S. Cl. ..................................... 367/128; 367/907
[58] Field of Search ............... 367/128, 907; 178/18; 84/626, 687; 364/516

[56] References Cited

U.S. PATENT DOCUMENTS

| | | | |
|---|---|---|---|
| 1,661,058 | 2/1928 | Theremin | 84/674 |
| 3,704,339 | 12/1972 | Niinomi | 84/687 |
| 4,043,241 | 8/1977 | Liu | 84/718 |
| 4,526,078 | 7/1985 | Chadabe | 84/653 |
| 4,627,324 | 12/1986 | Zwosta | 84/687 |
| 4,662,260 | 5/1987 | Rumsey | 84/653 |
| 4,716,804 | 1/1988 | Chadabe | 84/653 |
| 4,739,400 | 4/1988 | Veitch | 84/639 |
| 4,991,148 | 2/1991 | Gilchrist | 367/907 |
| 5,107,746 | 4/1992 | Bauer | 84/626 |

*Primary Examiner*—Daniel T. Pihulic
*Attorney, Agent, or Firm*—Jane Parsons

[57] ABSTRACT

A system is provided for tracking the three-dimensional position of an object within a three-dimensional region by triangulation techniques to generate signals corresponding to such three-dimensional positions. The signals may be used to operate a variably operable system to create a virtual reality system. The triangulation means may comprise at least three ultrasound emitters cooperating with ultrasound receivers located on a body moving in the three-dimensional region.

11 Claims, 9 Drawing Sheets

FIG.9

THREE-DIMENSIONAL DISPLACEMENT OF A BODY WITH COMPUTER INTERFACE

This application is a continuation-in-part application of application No. 484,985 filed Feb. 26, 1990, now U.S. Pat. No. 5,107,746.

BACKGROUND OF THE INVENTION

1. Field of the Invention

This invention relates to a control system for controlling the production of signals in response to three-dimensional movement.

This invention relates to a system for producing sound in response to movement of a body in three-dimensional space. The invention especially relates to the control of variably operable apparatus such as stage lighting, slide projectors, video projectors and, especially to the conversion of movement of a body to make music. The invention also relates to the control of variably operable equipment such as via a computer interface with virtual reality systems.

BACKGROUND OF THE INVENTION

At least as early as 1924, interest was being shown in the concept of making sound in response to the position of an object in space and, in 1928 a U.S. Pat. No. 1,661,058 issued to Theremin for a method and apparatus for generating sound. Theremin's apparatus comprised active oscillator elements which reacted to the passive presence of a body and the environment to produce audible sound. That apparatus bears little resemblance to more recent applications of the concept.

Much more recently, due, perhaps to the emergence of music synthesizer technology and computer technology, advances have been made in the conversion of movement to music. Usually the movement is human movement.

Exemplary prior art in the field is a variety of U.S. patents and other published articles. Zwosta in U.S. Pat. No. 4,627,324 issued Dec. 9, 1986 teaches the concept of attaching transducer devices to various parts of the human body, which devices generate signals in response to motion of the associated body part and the signals are converted to music. The transducers are motion sensitive devices. Niinomi in U.S. Pat. No. 3,704,339 issued Dec. 12, 1972 uses devices responsive to movement caused by muscle expansion or contraction to effect playing of an electronic musical instrument. Chadabe in U.S. Pat. Nos. 4,526,078 and 4,716,804 respectively issued Jul. 2, 1985 and Jan. 5, 1988 are merely computerized versions of the Theremin technique. Veitch in U.S. Pat. No. 4,739,400 issued on Apr. 19, 1988 uses optical means to determine the position of a person within a monitored area and uses that information to synthesize music. Also exemplary subject matter in the field are the subject matter of U.S. Pat. No. 4,043,241 issued Aug. 23, 1977 to Liu which discloses a plurality of music producing keys on the underside of a shoe and U.S. Pat. No. 4,662,260 issued May 5, 1987 to Rumsey which discloses a sound producing device producing different notes when rotated.

Another previous project utilizing visual means for providing positional information concerning a performer was carried out by Professor Collinge in conjunction with the E.D.A.M. Performing Arts Society. This project, the "Occulus Renae", consisted of a video camera connected through a digitizer to a computer. The camera was mounted over the top of a stage area in which a dancer performed. The motions of the dancer as viewed from above were used to trigger synthesizers in accordance with various algorithms programmed into the computer. The image produced was two-dimensional and only a single "indication of motion", parameter was used.

Another, somewhat related project was one which controlled and manipulated prerecorded or sequenced sounds rather than actually generating sounds. This project was carried out by Michel Waisvisz in 1986 and concerned a device worn by a performer which senses relative position and orientation and controls pitch, timbre and selection of synthesizer patches through the M.I.D.I. (Musical Instruments Digital Interface) protocol. This device requires hard wiring between the performer and the computer and the use of cables seriously limits the mobility of the performer.

Historically, it has been difficult to control the timing and response of such devices as lighting, slide projectors, video projectors, etc. in a coordinated manner such that they reinforce and enhance any message or feelings which are being conveyed by a live performance. The real time operation of industrial machinery, display apparatus and other industrial aids has generally not attempted to be coordinated with 3-dimensional use. Thus it has not been possible to simply cause equipment to operate with changes and responses to movements of a user in real time.

In one known attempt to provide a computer user with a simulated visual, audio, and kinesthetic environment in three dimensions, a user may typically wear a set of goggles containing liquid display flat-screens in front of each eye and a position sensor that measures the position and orientation of the head and one hand in three dimensions. As the user moves in three dimensions, computer generated images in the goggles are updated using positional information to create the effective movement inside a "virtual" space. This space contains the information of interest to the user. The user can effect the virtual space utilizing, for example, a "data glove" which may be worn on one hand.

Before the development of attempts to create a virtual reality environment, it was necessary to rely on artificial representation of techniques such as perspective drawing for many purposes. For example, in the study of fluid dynamics, it has been necessary to utilize drawings and scale models of situations in order to study changing situations. In cases such as this, it is much easier to investigate the action if it can be simulated in three-dimensional virtual reality. Parameters may be altered and results seen immediately in real time in response to simple three-dimensional movements.

A current limitation of virtual reality technology is that the user has a very limited region of motion in the real world. Thus the uses of the currently available technology are limited. The reasons for these limitations are at least partly because of the positioning technology currently employed, for example, the use of the data glove and its position sensor above referred to.

Uses of virtual reality are already varied and, if more sophisticated control equipment were available, the technology may develop into other areas. Two important applications currently under investigation are the visualization of relationships between various types of data and the use of virtual reality in the area of interactive computer simulations.

SUMMARY OF THE INVENTION

An attempt has now been made to provide a three-dimensional controller for variably operable systems utilizing a means for detecting the absolute position of a moving object, or parts of a moving object, utilizing positional data collected through the use of radiation emissions from spaced apart reference transmitters to the moving object whereby the position of the moving object may be calculated in real time by triangulation calculations. Thus, the inventor has attempted to provide a "three-dimensional mouse" for interfacing with a computer to general commands for various situations. The mouse analogy is also useful in appreciating the creation of music by three-dimensional movement.

The present inventor attempted to devise a system utilizing means for detecting the absolute position of a moving object or parts of a moving object such as the limbs of a human performer in three-dimensional space utilizing very simple position indicating means with a view to simplicity of hardware and software. The novel concept of using sound waves from four reference points to pinpoint the position of a performer by triangulation calculations was evolved.

Accordingly, there is provided a control system for operation in real-time of variably operable systems, comprising spaced apart reference means for providing sequential observation of positions of a remote control object in space, means to calculate by triangulation, sequential three dimensional positions of said object from said observation, and means to produce signals representative of the three dimensional positions; and interfacing means to interface said signals with variably operable systems.

Such a control system may comprise a control system for operation in real time of the variably operable system in response to movement of at least one object within a three-dimensional region, comprising; at least three ultrasound emitters located respectively at inertial reference points for triangulation determination of three-dimensional positions of said at least one object;

a pulse generator to provide ultrasound pulses to the ultrasound emitters;

a plurality of spaced apart receiving stations for each object, each receiving station comprising an ultrasound receiver and a pulse detector associated therewith to detect pulses received by the ultrasound receiver, each receiving station being associated with said object to move in a three-dimensional space with the object;

a receiver tracking microprocessor controller to receive and digitize pulses from each receiving station and to control the generation and timing of signals to the pulse generator, and to measure the time of pulse arrival to control the generation and timing of signals from the pulse generator, and to calculate from the elapsed time between the emission of a signal to the pulse generator and a detected pulse corresponding thereto from a respective receiving station, radial positional data for the respective receiver for each pulse therefrom, and to generate radial position-indicating signals therefrom;

an encoder associated with the receiver tracking microprocessor controller to encode pulse arrival times into a form suitable for radio transmission;

a radio transmitter for encoded signals corresponding to the pulse arrival times;

a radio receiver remote from said at least one object and from the radio transmitter to receive encoded signals from the radio transmitter;

a decoder to decode signals from the radio receiver;

an object tracking microprocessor controller for receiving said decoded radial positional data for each ultrasound receiver associated with said at least one object, for computing a three-dimensional position of at least one object in terms of, and in terms of the radial positional data for said at least one object, velocity and acceleration of the object and, on the one hand, generating commands for the pulse generator for the ultrasound emitters, and, on the other hand, interfacing with a computer for generating commands in response to the computed three-dimensional positions of the object and from the radial positional data for each ultrasound receiving station of said at least one object to control variations of said variably operable system.

In practice, it is found that four ultrasound emitters are preferred since the object itself may be capable of blocking reception of pulses. If four emitters are used the possibility of blocking more than one emitter is diminished. Additionally, four emitters allow some error correction; since only three speakers are required for triangulation. There are several ways to calculate a position based on different triplets of speakers. This allows one to detect and reject timing errors, resulting in higher positional accuracy.

Any high frequency sound above the audible range may be used. Each of three speakers may emit sound pulses of approximately 0.5 to 4 milliseconds duration each. The pulses may be emitted on the command of a microprocessor based controller. The detection of a pulse at an object which is to be tracked is communicated back to the microprocessor by a radio link. The microprocessor may then measure the amount of time that elapses between the emission and reception of a pulse. This time varies directly with the distance of the sound receiver from the speaker and so gives a measurement of the distance between the two. Four speakers are used so as to be able to gain a measure of distance between the receiver and four known reference points. This allows one to determine the absolute position of the receiver in three-dimensions by triangulation. Four speakers are used instead of three in order to improve the accuracy and consistency of measurement.

It is possible to measure variables consisting of distance, velocity and acceleration in each of the three spatial dimensions. Thus, for one calculation, nine separate quantities are measured, three for each dimension.

Any object to be tracked has a receiver or sensor attached to it. Several sensors, for example four, may be tracked by the system. The frequency of measurement of the position of the sensor may be about 3–300 times per second. The spatial resolution of the system may be between $\frac{1}{4}$" and 1". Thus, the state of several objects, or different parts of the body, may be sampled continuously at about 30 times per second with spatial resolution of around $\frac{1}{4}$" in each of the three spatial dimensions.

It is also possible to provide for feature recognition. Thus, specific sequences of positional data may be recognized as a specific gesture having a preset response.

BRIEF DESCRIPTION OF THE DRAWINGS

Embodiments of the invention will now be described by way of example with reference to the drawings, in which.

DETAILED DESCRIPTION OF A PREFERRED EMBODIMENT

Figure 1:
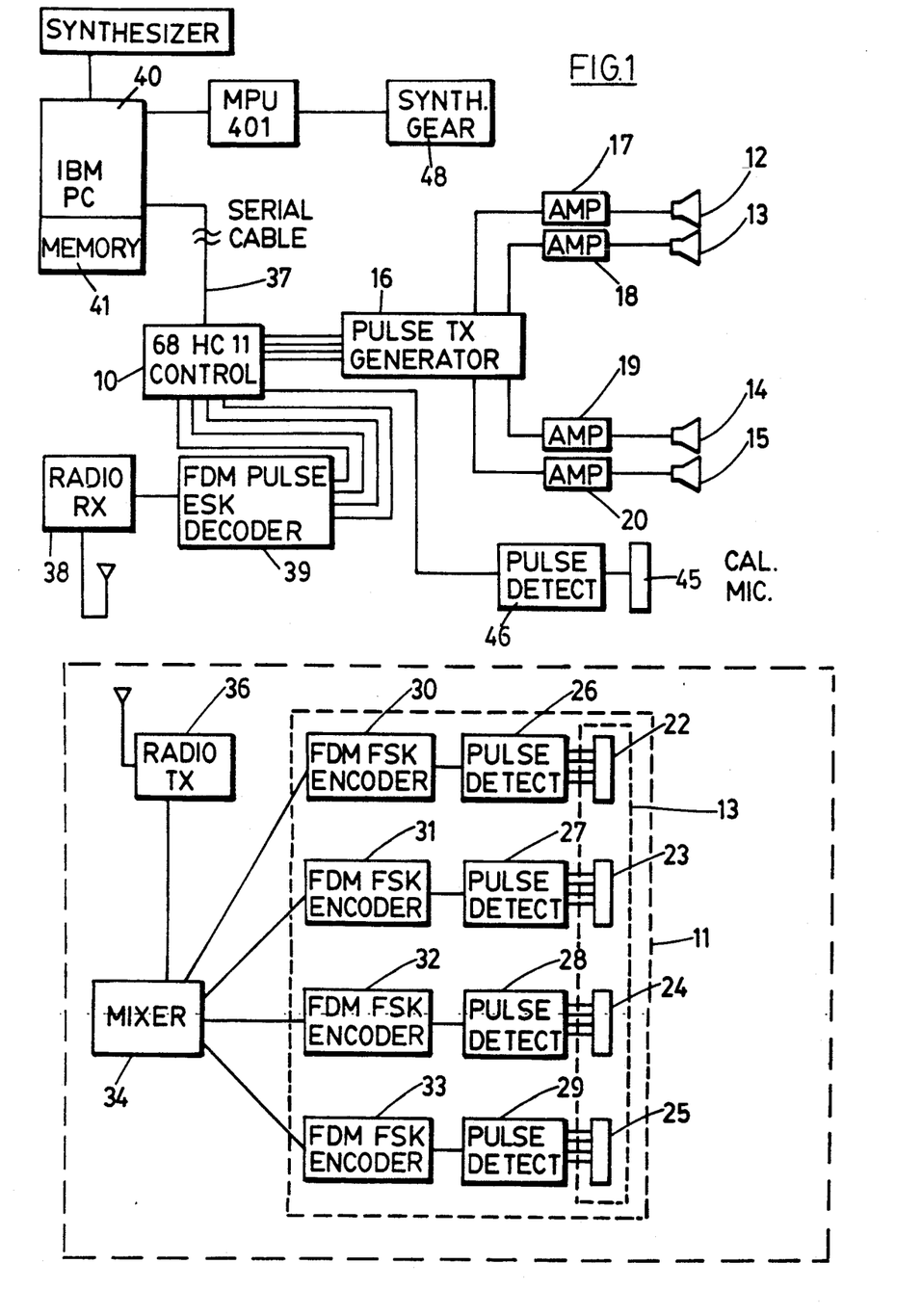
FIG. 1 is a block diagram of one system according to the invention.

FIG. 1 shows a microprocessor controller 10 which sends signals to each of speakers 12, 13, 14 and 15 causing them to emit sound pulses of approximately 0.5 to 4 milliseconds duration each. The sound pulses should be of sufficiently high frequency to be above the level of audible sound. A frequency range of 20 KHz to 30 KHz is suitable. The pulses may be generated by any suitable means 16 and be subjected to amplification by pulse generator and amplification means 17, 18, 19 and 20 for respective speakers 12, 13, 14 and 15. It is possible to replace amplifiers 17, 18, 19 and 20 by a single amplifier and a set of solid state power switches.

Each of the speakers 12, 13, 14 and 15 is located at a specific inertial reference point forming a base for triangulation to determine the position of a moving object, usually a human body, within a three-dimensional region.

A human performer within the three-dimensional region may have microphone arrays 13 attached to various parts of his body. For example, four microphone arrays may be used, one for each arm and one for each leg. The microphones will usually be located on that part of the limb subject to maximum movement. For example, the microphone sets arrays 22, 23, 24, 25 for the arm may be located at or near the hand. Each microphone array 13 may be provided with a casing for discrete placing on a human body. This assembly comprises wand 11. The casing may be a bracelet or anklet which comprises the wand 11 and is linked by a cable to a pulse detector 26, 27, 28, 29, encoder 30, 31, 32, 33 and hence to transmitter 36. The pulse detector and encoder associated with each microphone may be in the wand as shown or may be spaced from the wand by their cabling.

An ultrasound signal from any of speakers 12, 13, 14 or 15 will go to each of microphone sets 22, 23, 24 and 25 which are assembled into microphone array 113. Each signal may be identified with a microphone by reference to the time frame in which it is emitted. The time frame for each microphone will be dependent on its distance from the speaker. Alternatively pulses may be identified by frequency.

The microphone sets 22, 23, 24, 25 are each connected to a detection circuit 26, 27, 28, 29 respectively for detecting a pulse from the pulse generator. Detection may be by any convenient means. For example, for any generated pulse the detector circuit may be set for a time within a time margin for the particular position of a microphone set with respect to the emission point of the pulse, to detect the pulse. Alternatively each pulse may be identified by frequency measurement. An encoder converts the detected pulse into a form suitable to radio frequency modulation and each detector is provided with pulse encoder 30, 31, 32, 33 respectively. Coded pulses are fed to the mixer 34. A radio transmitter 36 is connected to the encoder circuit to transmit each pulse from, mixer 34 to a radio receiver 38 connected to the microprocessor controller 10 through the decoder 39. Both the mixer 34 and the transmitter 36 are located on the human body also.

The microprocessor 10 then measures the amount of time that elapses between the emission and reception of a pulse. This time varies directly with the distance of each wand from the speaker and so gives a measurement of the distance between the two. This is done for each of the four speakers 12, 13, 14, 15 producing four timing measurements for each wand 11. This information is then used to calculate the radial position of each wand relative to each speaker by dividing the time measurement by an appropriate calibration constant. The calibration microphone 45 and pulse detector 46 enable the determination of this constant for all temperatures and humidities. The calibration microphone 45 is at a known distance from the speakers 12, 13, 14, 15 so knowledge of the time from a pulse's transmission to its detection at the calibration microphone allows a direct calculation of this constant. These four radial coordinates are then transmitted by a serial communications port 37 to a personal computer 40 for processing and/or storage. A program for running the controller 10 is straightforward and, once the concept of using high frequency sound as a locator means for a moving object is accepted, well within the scope of a man skilled in the art. The controller 10 may be, for example, a 68HCII manufactured by Motorola.

Position indicating signals calculated by the microprocessor controller 10 pass to computer means 40 which may suitably be a microcomputer of the personal computer type.

The computer 40 is provided with software to enable the user to make a map of sub-regions its memory 41 in which movement will take place. This sound map is a map which specifies how certain physical gestures will be interpreted musically in each sub-region of the performance space. A sound map consists of several "layers". Each layer occupies the entire length and width of the performance space as well as a user specified range of heights. Associated with each layer is a single mapping relation specifying the following:

1. Which of the nine spatial "state" variables (position, velocity, and acceleration in each of the three spatial dimensions) will be mapped to what byte of what M.I.D.I. command?

2. What is the relation governing this mapping?

Sub-regions are defined by specifying which areas of a layer are to be actively mapped into sound using the associated mapping relation. This is done by drawing two dimensional shapes (which are assumed to extend over the range of valid heights specified for the layer) within the layer. The areas filled by these shapes are regions in which the mapping relation will be utilized to generate sound. If the performer is not in a filled area, no sound will be generated using the layers mapping relation.

Figure 3:
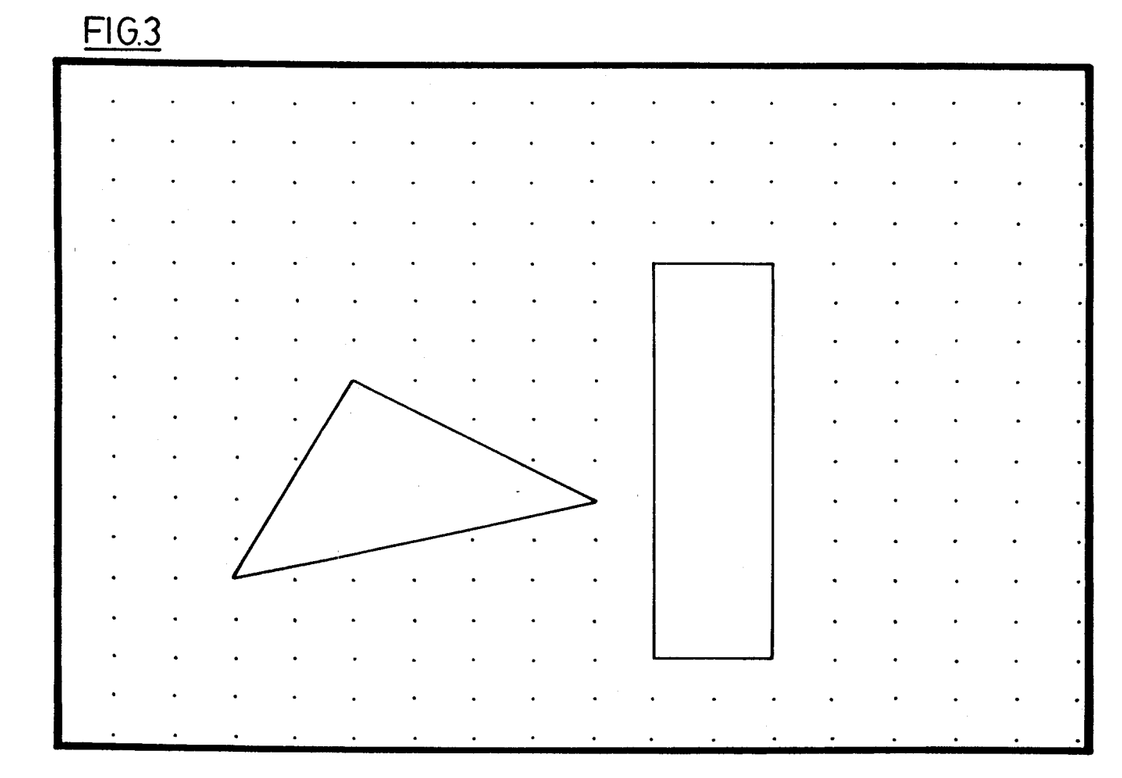
FIGS. 3, 4, 5 and 6 show samples of map editing.
Figure 4:
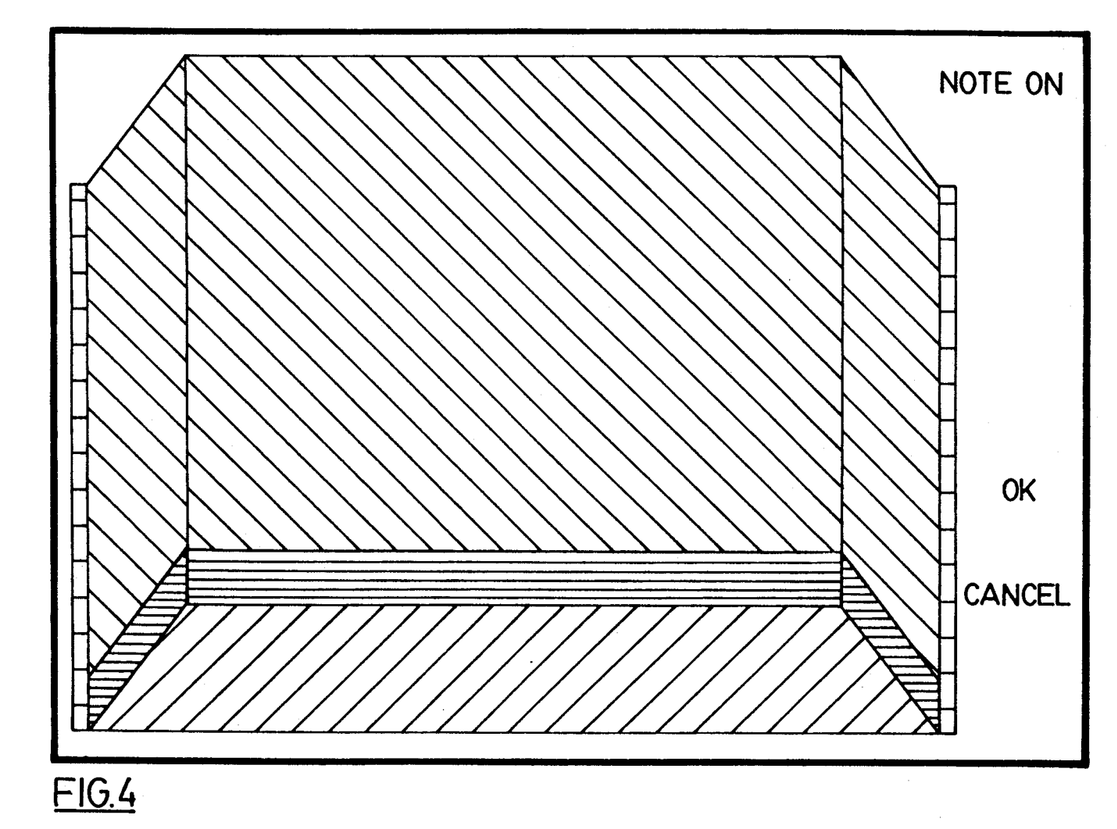
Figure 5:
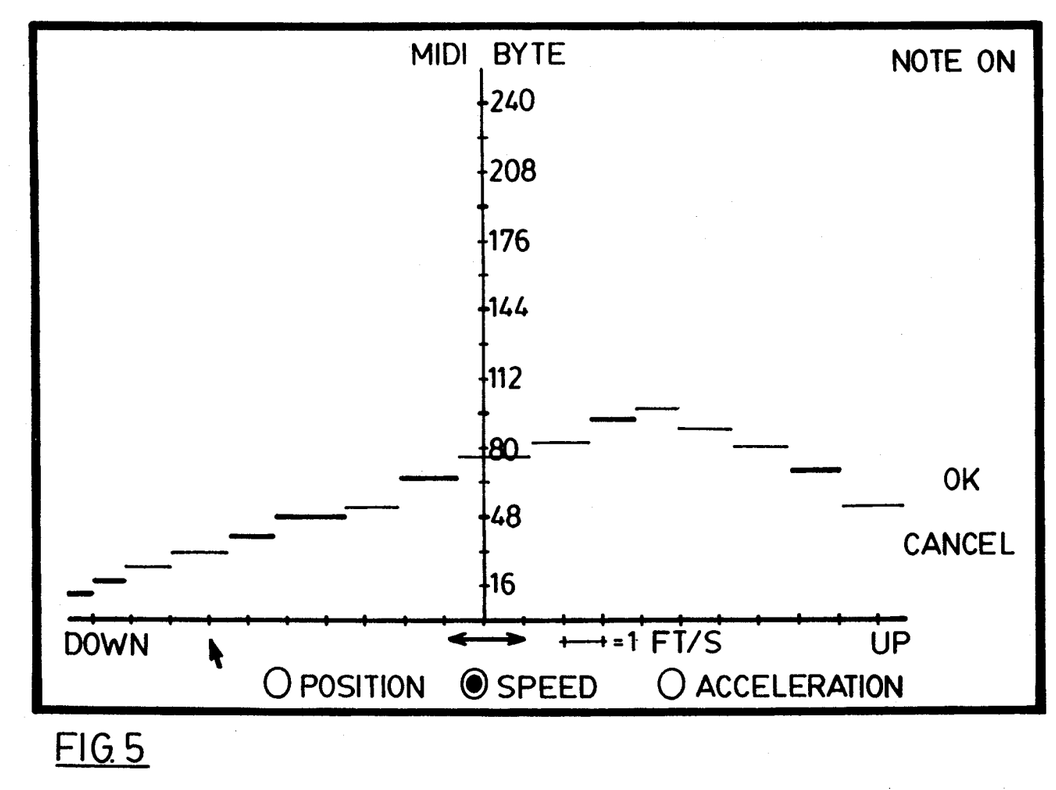
Figure 6:
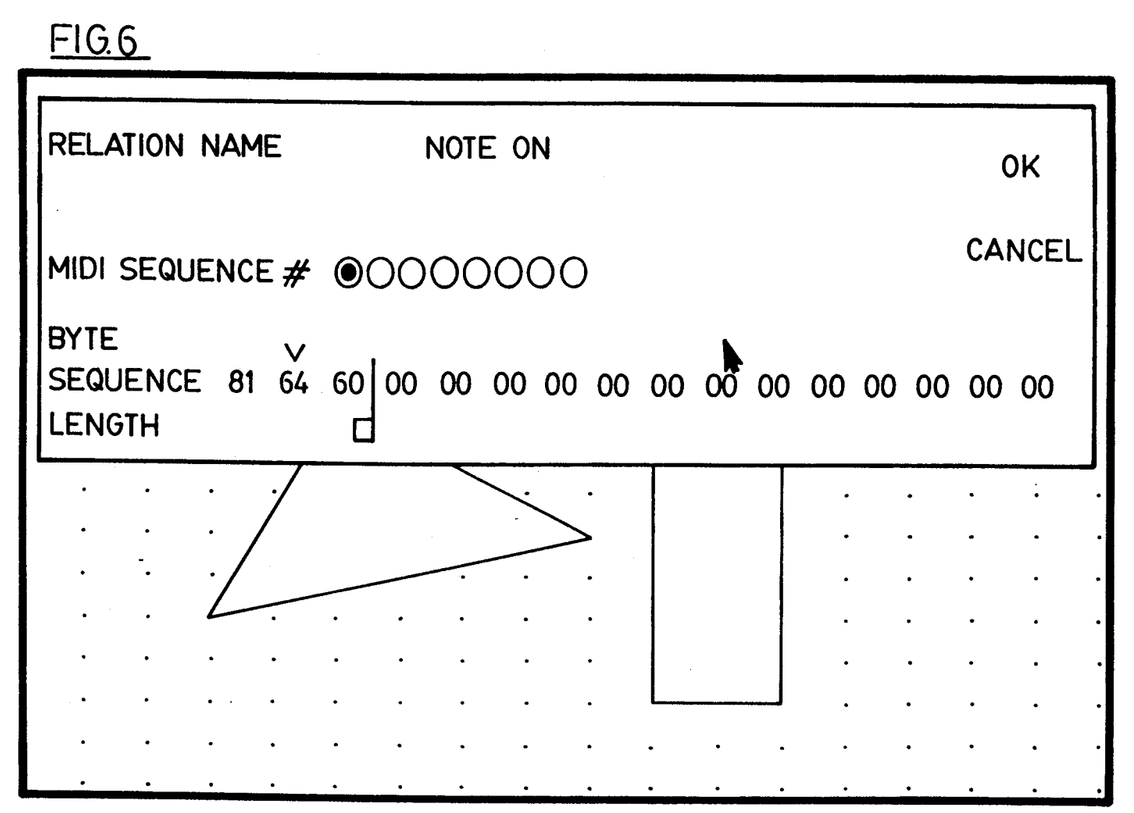

FIGS. 3, 4, 5, and 6 are examples of the editing process for a layer. In FIG. 3, a triangle and a rectangle specify where the mapping is to be applied within the performance area. The dots in the image are a grid, superimposed for editing purposes, which has no effect on the map when it is in use. FIG. 4 shows for what range of heights the layer is valid; in this case it is the horizontal hatched section, along and near the floor (diagonal cross hatching) of the performance space. FIG. 5 shows the M.I.D.I. command that will be mapped to. The "V" indicates the byte of the command that will be changed by the mapping. In this case we are mapping velocity in the vertical direction to the pitch (note) byte of a "Note On" M.I.D.I. command. FIG. 6 shows just what the mapping relation will be; the note value will vary in a stepwise manner with vertical-direction velocity. Thus, for this layer, whenever the performer is either within the solid triangle or on the lines around the unfilled rectangle, his velocity will generate M.I.D.I. "Note On" commands. The note turned on will be determined by the vertical-direction velocity as per FIG. 6.

Many layers can be specified per map which, when taken together, generate a number of musical actions as one moves about the performance space. It should be noted that any layer can have active sub-regions occupying all or part of the same physical volume as another layer.

The computer 40 is also provided with real-time processing software. The processing software allows musical interpretations of the movement which depend on the current set of measurements of acceleration, velocity and distance in each of the three spatial dimensions measured by the microprocessor controller as a result of the high frequency sound pulses emitted from each of the speakers 12, 13, 14, 15 and at the four reference locations.

For example, it may be desirable to associate the performer's position in a four square meter area of the stage with the ability to control the timbre of the sounds by the velocity at which he moves his hands. In another area which may or may not be of the same size, it may be desirable to make the spatial distribution of the sound between the different music producing speakers dependent on hand position of the performer. The velocity based control of the timbre may be retained during this additional control. Thus, a number of different mappings of motion into music may be set up, and cross-fades may be established between the sub-regions. The performer may then move from one to another sub-region expressing different musical results by similar movements.

A separate layer of the sound map is set up for each spatial-to-sound relation it is desired to specify. When the performer moves in performance area, the effect will be that of moving through all the active sub-regions at once, as if they had been superimposed on one another to form a single composite map of the space. This superposition of relationships allows production of a rich variety of complex and interesting control structures.

Figure 2:
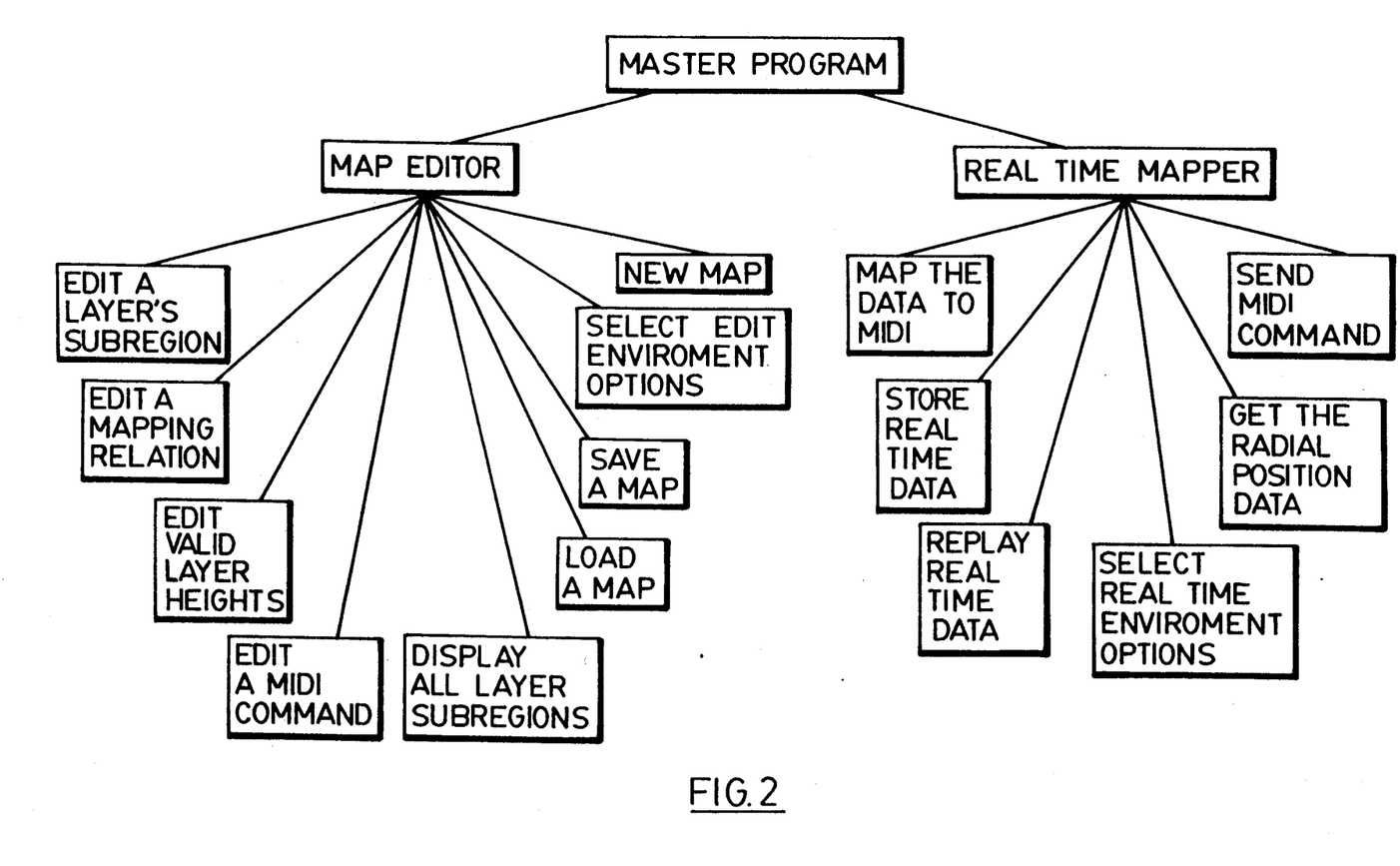
FIG. 2 is a block diagram of the software design for map generation.

FIG. 2 shows a block diagram detailing the functional modules of the overall P.C. software design. In "Map Editor" mode, the user can edit a new sound map, load an existing one from disk, and save the current map to disk. Layer sub-regions, layer heights, mapping relations, and M.I.D.I. commands can all be edited.

In performance real-time mode, the generated map or maps may be used with a musical instrument digital interface (M.I.D.I.). A software module for the computer 40 allows the computer to poll the positional information data at regular intervals, for example 30 times per second. On the basis of the sound map in use and the positional information signals different commands will be issued via M.I.D.I., thereby generating different sounds from the music synthesizer 48. Incoming data may be stored to disk, allowing a performance to be recorded for later replaying.

One suitable programming language for the computer software is Turbo Pascal, but any suitable language may, of course, be used.

Figure 7:
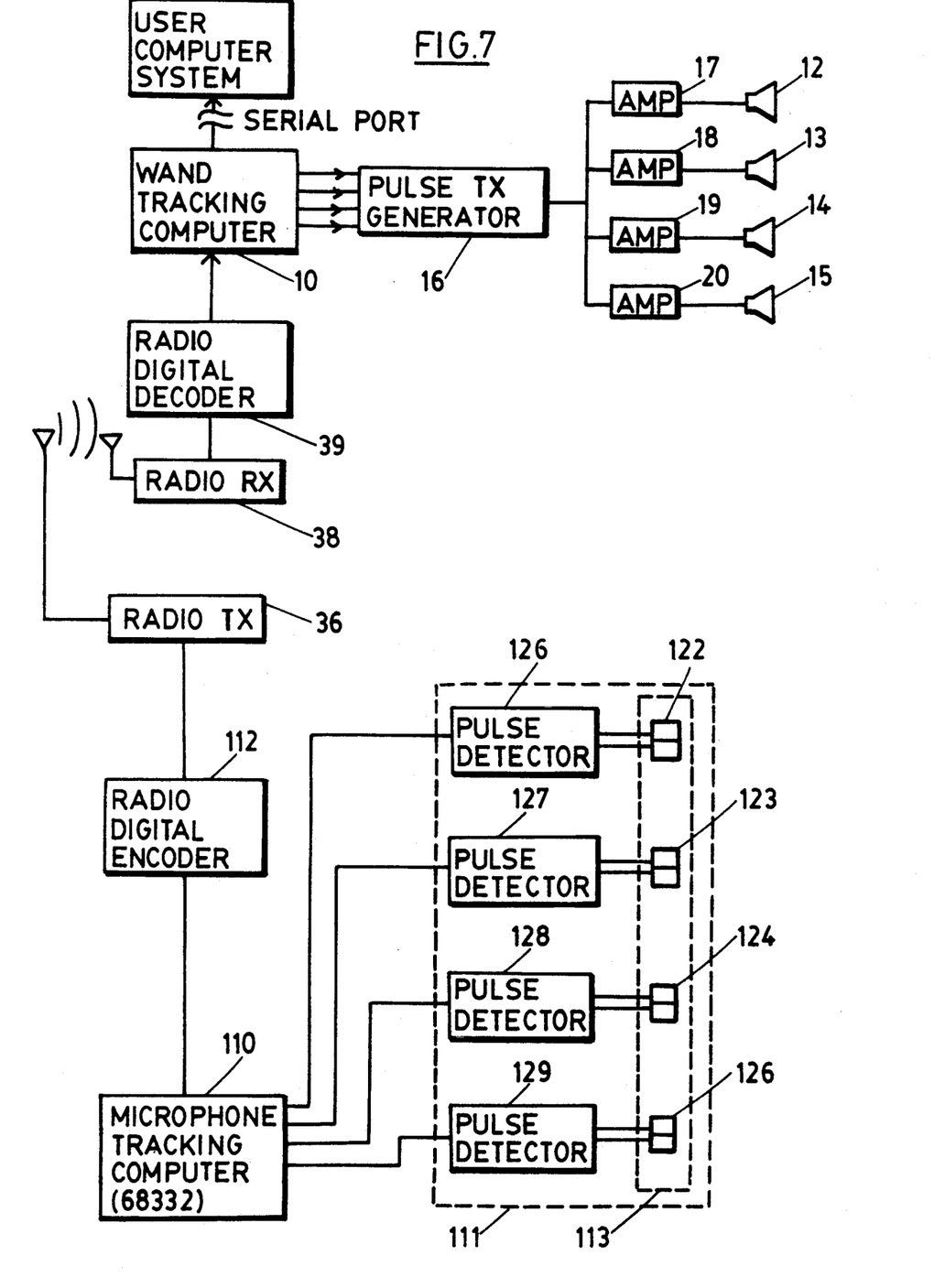
FIG. 7 is a block diagram of another system of the invention.
Figure 8:
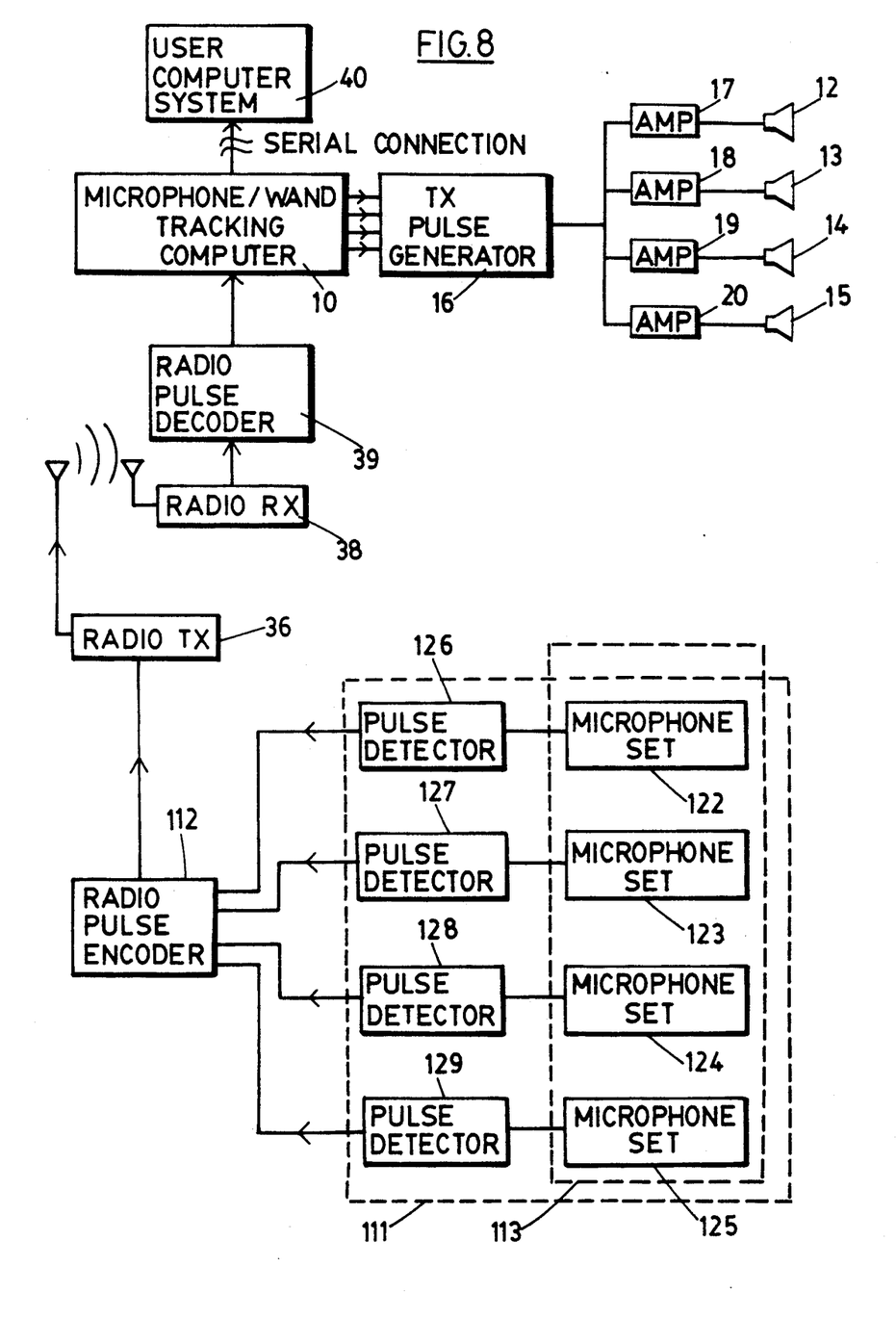
FIG. 8 is a block diagram of yet another system of the invention.
Figure 9:
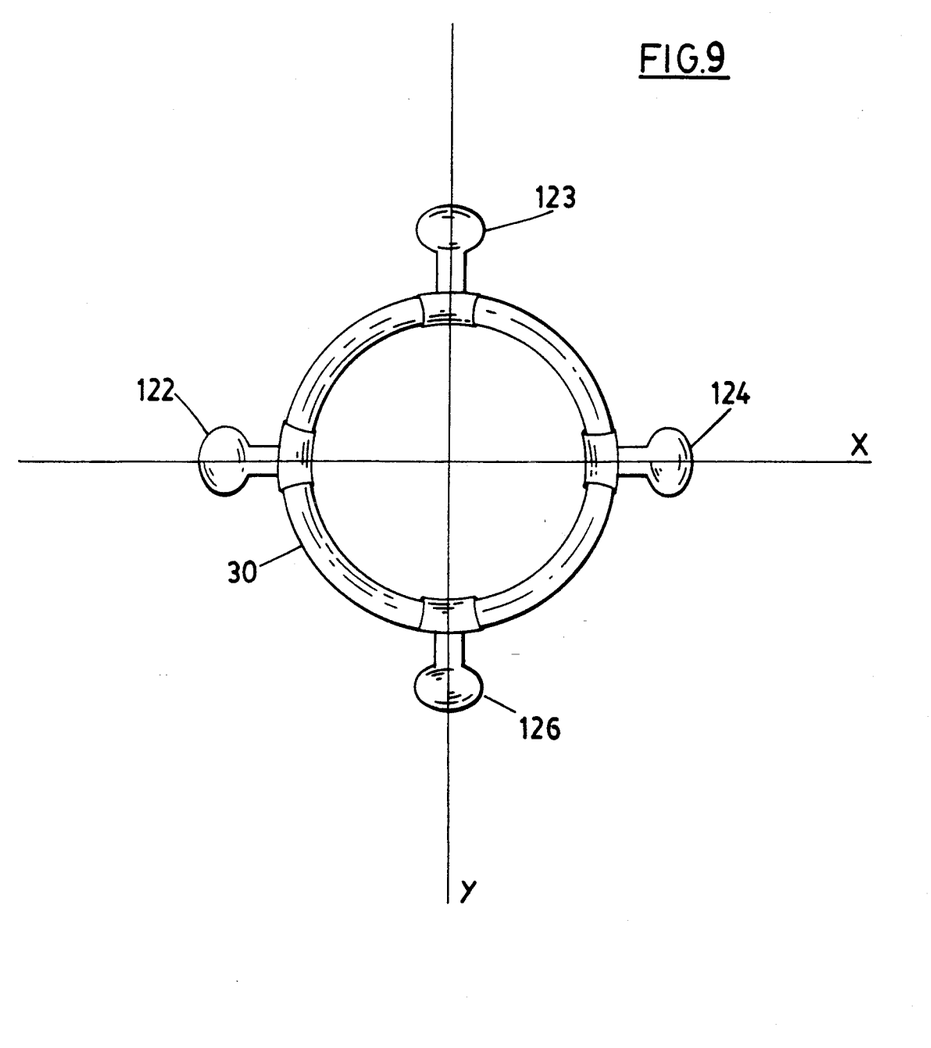
FIG. 9 is an embodiment of a microphone array geometry.

Referring now to FIGS. 7, 8 and 9 another embodiment is illustrated and similar reference numerals are used only where apparatus parts are strictly comparable.

FIG. 7 shows a microphone tracking computer 110 which sends signals by way of a radio digital encoder 112, a radio transmitter 36, a radio receiver 38, a radio digital decoder 39, and a wand tracking computer 10, to a pulse generator 16. This causes the pulse generator 16 to emit pulses which are amplified by amplifiers 17, 18, 19 and 20 and sent to each of speakers 12, 13, 14 and 15 causing them to emit sound pulses of approximately 0.5 to 4 milliseconds duration each. The sound pulses should be of sufficiently high frequency to be above the level of audible sound. A frequency range of 20 KHz to 30 KHz is suitable. The pulses may be generated by any suitable means 16 and be subjected to amplification means 17 for respective speakers 12, 13, 14 and 15.

Each of the speakers 12, 13, 14 and 15 is located at a specific inertial reference point forming a base for triangulation to determine the position and rotation of a moving object, usually a human body, within a three-dimensional space.

A human user within the three-dimensional region may have microphone arrays 113 attached to various parts of his body. Each microphone array 113 consists of a set of omnidirectional microphone sets 122, 123, 124 and 125 arranged in a geometry that will allow the computation of three-dimensional position, velocity, acceleration, and rotational orientation. Each microphone array 113 has associated with it pulse detection circuitry 126, 127, 128 and 129. In this case, the combination of the microphone arrays and pulse detection circuitry for each object comprises a "wand" 111. It is the three-dimensional position, velocity, acceleration, and rotational orientation of each wand 111 that is sensed by the wand tracking computer 10. Up to four wands 111 may be in use in the exemplified system. However, if desirable, there is no reason why more could not be added.

Each wand 111 is connected to a microphone tracking computer 110 which detects the arrival of pulses to each microphone set 122, 123, 124 and 125 and encodes this timing information into digital form. The microphone tracking computer 110 controls the generation of pulses, the timing of the intervals between pulse emission and detection, and the calculation of three dimensional position for each of the microphone sets 122, 123, 124 and 125. It can be any computer system which includes a real time pulse detection and timing interface. An example of such a system is the Motorola 68332 microcontroller. The 68332 is suggested because of its ability to handle up to 16 independent timing inputs (which allows the use of up to four wands). However, any other microcontroller with similar capabilities may be used.

The microphone tracking computer 110 performs several tasks to accomplish the above-mentioned functions. Firstly, it generates commands which control the firing of speakers 12, 13, 14 and 15. These commands are transmitted digitally over the radio link to the wand tracking computer 6 which interprets them to the pulse Tx generator 16. After the pulses have been sent, the microphone tracking computer 110 gathers detected pulses and decides whether they are valid. When it has recognized the received pulses, it calculates the three dimensional position of each of the microphone sets 122, 123, 124 and 125 in each wand's microphone array 113. This is done by measuring the time elapsed between the pulse's emission and detection. This time varies directly with the distance of each microphone sets 122, 123, 124 and 125 from the speaker and so gives a measure of the distance between the two. Four measurements are gathered for each microphone set 122, 123, 124 and 125 corresponding to the set's distance from each of the four speakers 12, 13, 14 and 15. These four radial measurements are then used to calculate the microphone set's position in three dimensions. This process is performed for each of the microphone sets 122, 123, 124 and 111 in each wand's microphone array 113. The coordinates of each microphone set 122, 123, 124 and 125 are encoded in digital form and sent to the radio digital encoder 112 where they are converted into a form suitable for radio transmission. From there they are transmitted via the radio transmitter 36 to the radio receiver 38 where they are decoded by the radio digital decoder 39 and conveyed to the wand tracking computer 10.

The wand tracking computer 10 is used to calculate velocity, acceleration, and pitch, yaw, roll orientation in three dimensions based on the positional information supplied by the microphone tracking computer 110. It can be any computer system which is fast enough to perform these calculations in real time and having which has parallel input and output capabilities plus at least one serial port to transmit data to a user computer system 40. An example of an appropriate system is a single board IBM PC/AT or equivalent domestic computer.

The wand tracking computer 10 calculates velocities by subtracting successive positional values in order to obtain a measure of the rate of change of position. Similarly, accelerations are calculated by comparing differences between successive velocities. Rotational information is calculated by examining the changes in three dimensional position that occur to groups of two microphone sets existing on a collinear axis. For example, in FIG. 8, microphone sets 122 and 124 exist on collinear axis X while microphone sets 123 and 125 exist on collinear axis Y. For a wand geometry as defined in FIG. 8, rotation about the centre of the bracelet causes the microphone pairs to describe arcs about the bracelet's centre. No matter what type of rotation occurs, at least one group of two speaker sets will describe a circular arc about the centre of the bracelet. Changes of arc can thus be measured and expressed in appropriate units for each of the pitch, yaw, and roll rotational orientations. Alternatively, rotational state could be sensed by a specific rotation sensor attached to the same mechanical structure as the wand's microphone set(s). In this case, there would be no reason to employ more than one microphone set per wand.

Once calculated, the three dimensional position, velocity, and acceleration information is made available to the user computer system 40 along with the rotational pitch, yaw and roll data. All of this information is provided for each wand being monitored by the system. User computer systems that make use of the sort of information provided are potentially many and varied, but a specific application involves computer systems that employ "virtual reality" or other new computer interfaces of that type. One system according to the invention is intended as a user interface for these types of systems, much as a mouse is a user interface for current personal computer systems. However, this specifically does not in any way preclude its usefulness in other applications such as robotics, gait analysis, teleoperation, or certain types of new computer operating systems such as those currently under investigation as Xerox's Palo Alto Research Centre.

A wand 111 will usually be located on that part of the limb subject to maximum controlled movement. For example, the microphone array 113 comprised by microphone sets 122, 123, 124 and 125 might be worn on or near the hand in a geometry similar to that shown in FIG. 9. Each microphone array 113 may be provided with a casing for discrete placement on a human body. The casing may be a bracelet or anklet 300 which supports the microphone array 113 and may be linked by a cable or connected directly to pulse detectors 126, 127, 128 and 129.

An ultrasound signal from any of speakers 13, 14 or 15 will go to each of microphone sets 122, 123, 124 and 125. Conveniently, although not necessarily, these sets may be pairs. When detected by a wand 111, each signal may be identified by reference to the time frame in which it is emitted. The time frame for each microphone will be dependent on its distance from the speaker. The microphone sets 122, 123, 124 and 125 are connected to pulse detection circuits 126, 127, 128 and 129 respectively and a microphone tracking computer 110. These items comprise a subsystem which detects a pulse emitted from the pulse generator and measures the time taken for the pulse to arrive. Detection may be by any convenient means. For example, for any generated pulse the microphone tracking computer 110 may be programmed to treat only pulses detected within a certain time window as valid. The boundaries of such a window would be based on the last known position of the wand 111, the positional sampling rate of the system, and the maximum expected rate of movement. For each wand 111, one window would be calculated to frame the expected arrival of each speaker's pulse. This technique allows for the recognition of each pulse's source speaker as well as the rejection of noise and echoes.

The arrangement of FIG. 8 differs from that of FIG. 7 in that it shows an arrangement in which control and timing of pulses may be carried out remote from the operator after the radio transmission. In this case radio transmission may well be of analog signals rather than digitized signals. Wand tracking computer 110 of FIG. 7 is unnecessary and tracking functions for both wand and operator are performed by computer 10.

I claim:

1. A control system for operation in real time of a variably operated system in response to movement of at least one moving object in a three-dimensional region, comprising:

at least three ultrasound emitters located respectively at inertial reference points for triangulation determination of three-dimensional positions of said at least one object;

a pulse generator to provide ultrasound pulses to the ultrasound emitters;

a plurality of spaced apart receiving stations for each object, each receiving station comprising an ultrasound receiver and a pulse detector associated therewith to detect pulses received by the ultrasound receiver, each receiving station being associated with said object to move in a three-dimensional space with the object;

an encoder associated with the receiving stations microprocessor controller to encode pulse arrival times into a form suitable for radio transmission;

a radio transmitter for encoded signals corresponding to the pulse arrival times;

a radio receiver remote from said at least one object and from the radio transmitter to receive encoded signals from the radio transmitter;

a decoder to decode signals from the radio receiver;

a receiver tracking and object tracking microprocessor controller to receive decoded signals from the decoder and, on the one hand, to measure the time of pulse arrival to control the generation and timing of signals from the pulse generator, and to calculate from the elapsed time between the emission of a signal to the pulse generator and a detected pulse corresponding thereto from a respective receiving station, radial positional data for the respective receiver for each pulse therefrom, and to generate radial position-indicating signals therefrom;

and, on the other hand, for computing a three-dimensional position of at least one object in terms of the radial positional data for said at least one object, velocity and acceleration of the object and generating commands for the pulse generator for the ultrasound emitters, and interfacing with a computer for generating commands in response to the computed three-dimensional positions of the object and from the radial positional data for each ultrasound receiving station of said at least one object to control variations of said variably operated system.

2. A control system for operation in real time of a variably operable system in response to movement of at least one moving object in three-dimensional region, comprising;

at least three ultrasound emitters located respectively at inertial reference points for triangulation determination of three-dimensional positions of said at least one object;

a pulse generator to provide ultrasound pulses to the ultrasound emitters;

a plurality of spaced apart receiving stations for each object, each receiving station comprising an ultrasound receiver and a pulse detector associated therewith to detect pulses received by the ultrasound receiver, each receiving station being associated with said object to move in a three-dimensional space with the object;

a receiver tracking microprocessor controller to receive and digitize pulses from each receiving station and to measure the time of pulse arrival to control the generation and timing of signals from the pulse generator, and to calculate from the elapsed time between the emission of a signal to the pulse generator and a detected pulse corresponding thereto from a respective receiving station, radial positional data for the respective receiver for each pulse therefrom;

an encoder associated with the receiver tracking microprocessor controller to encode pulse arrival times into a form suitable for radio transmission;

a radio transmitter for encoded signals corresponding to the pulse arrival times;

a radio receiver remote from said at least one object and from the radio transmitter to receive encoded signals from the radio transmitter;

a decoder to decode signals from the radio receiver;

an object tracking microprocessor controller for receiving said decoded radial positional data for each ultrasound receiver associated with said at least one object, for computing a three-dimensional position of at least one object in terms of the radial positional data for said at least one object, velocity, and acceleration of the object and, on the one hand, generating commands for the pulse generator for the ultrasound emitters, and, on the other hand, interfacing with a computer for generating commands in response to the computed three-dimensional positions of the object and from the radial positional data for each ultrasound receiving station of said at least one object to control variations of said variably operable system.

3. A system as claimed in claim 2, in which four ultrasound emitters are used.

4. A system as claimed in claim 2 in which the variably operable system is a virtual reality system.

5. A system as claimed in claim 2 on which the variably operable system is variably operable apparatus.

6. A system as claimed in claim 2 in which the variably operable system is a music synthesizer.

7. A system as claimed in claim 6 in which the computer is provided with means to generate a map onto which the dimensional positional data is plotted, the map including regions in which three-dimensional positional data generates different commands.

8. A system as claimed in claim 2, in which the ultrasound has a frequency in the range of from 20 KHz to 30 KHz.

9. A system as claimed in claim 4, in which at least one object is attachable to a human body part.

10. A system as claimed in claim 8, in which more than one ultrasound receiver is present, an array of said receivers being included in each object.

11. A system for tracking an object within a three dimensional region comprising;

at least three ultrasound emitters located respectively at respective inertial reference points for triangulation determination of the three-dimensional position of said object;

at least one ultrasound receiver associated with said object to move in the three-dimensional region;

a pulse detector associated with each ultrasound receiver to detect pulses received thereby;

a receiver tracking microprocessor controller to receive and digitize pulses from each receiver, and to measure the time of pulse arrival to control the generation and timing of signals from the pulse generator and to calculate from the elapsed time between the emission of a signal to the pulse generator and a detected pulse corresponding thereto from a respective receiver, radial positional data for the respective receiver for each pulse therefrom;

a pulse encoder to encode pulse arrival times from the receiver tracking microprocessor into a form suitable for radio transmission;

a radio transmitter associated with the encoder and a radio receiver remote from said object, the radio transmitter being adapted to transmit data corresponding to detected pulses to the radio receiver;

a pulse decoder associated with the radio receiver to decode transmitted pulses into a form suitable for microprocessor detection;

a microprocessor controller adapted to detect transmitted pulses from the decoder and to send signals to the ultrasound emitters to initiate emission of ultrasound pulses therefrom, to measure elapsed time between the emission of an ultrasound pulse from respective ultrasound emitters and a detected pulse corresponding thereto, to calculate radial positional data for the object from the elapsed times for pulses from each of the emitters and the object, and to generate position indicating signals; and computer means interfaced with the microprocessor controller for receiving said position indicating signals therefrom, computing the three dimensional position, velocity, and acceleration of the object.

* * * * *